March 11, 1958  H. C. BOX ET AL  2,826,070
VORTEX TUBE FREE AIR THERMOMETER
Filed May 24, 1956
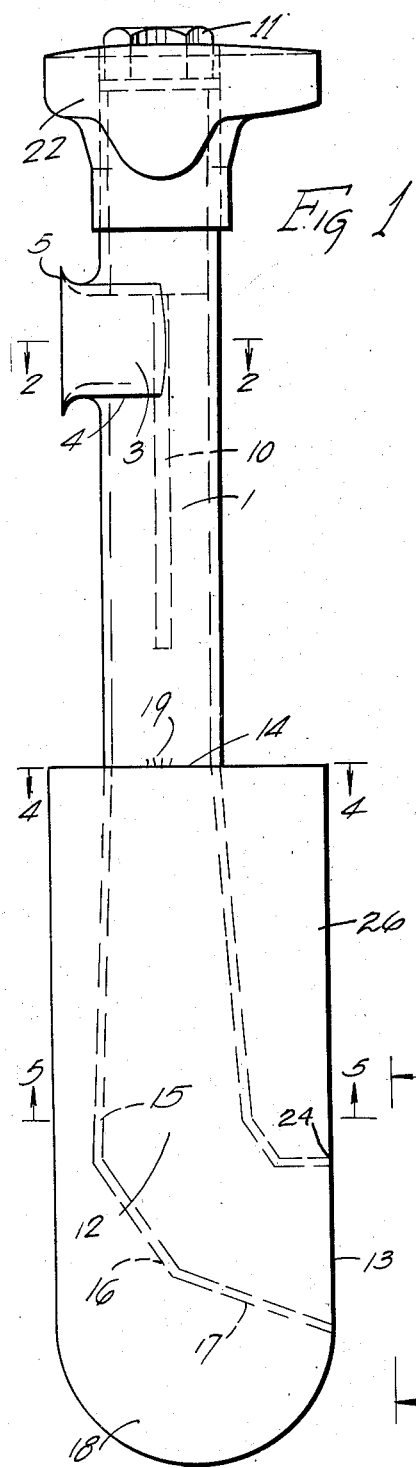
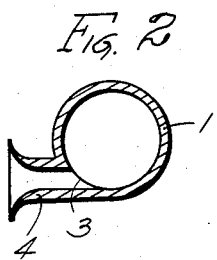
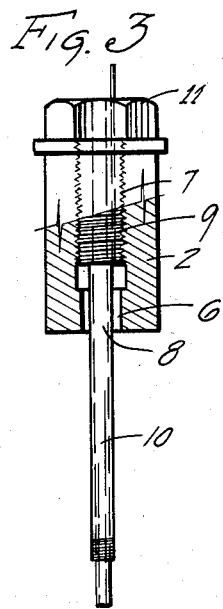
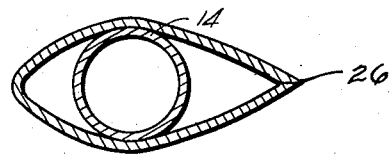
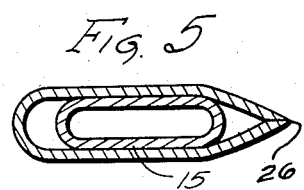
INVENTOR.
HAROLD C. BOX
LEO S. PACKER
BY
ATTORNEYS

United States Patent Office 2,826,070
Patented Mar. 11, 1958

2,826,070

VORTEX TUBE FREE AIR THERMOMETER

Harold C. Box, Williamsville, and Leo S. Packer, Eggertsville, N. Y., assignors, by mesne assignments, to the United States of America as represented by the Secretary of the Navy Application May 24, 1956, Serial No. 587,181

3 Claims. (Cl. 73—349)

This application concerns a vortex tube free air thermometer for use on military aircraft.

The accurate measurement of the free air temperature from an airplane during flight is an essential element for the proper functioning of a military aircraft. Many important computations need the true free air temperature to be ascertained. With the rapid development of aircraft speeds, reliable temperature readings have become increasingly harder to determine. The primary reason for this is that with present day instruments, a characteristic error is introduced by the relative motion of the thermometer and the air. Since this error is proportional to the free air temperature and the square of the Mach number, the error may be as high as 40 degrees C. for high subsonic sea level flight. This error is caused by two aerodynamic effects: (1) the heating due to compression or damming of the air in the inevitable stagnation field upstream of the thermometer, and (2) the frictional heat generated in the boundary layer which forms on the thermometer surface.

Various methods have been used to obtain the correct temperature reading. If the heating effect is small or not important, the observed temperature may be used.

Another method is to subtract a correction representing the heating effect from the observed temperature. This latter method is not feasible in military aircraft since it requires a knowledge of airspeed and a prior calibration of the thermometer in terms of a recovery factor that necessitates auxiliary instrumentation and computation with the consequent possibility of error.

The best method to obtain the correct free air temperature is to incorporate in the instrument a refrigerating process that under all conditions of flight will completely and automatically compensate for the heat rise incident to capturing the ram air. To achieve the above result, this invention involves the use of a vortex tube. The heating effect due to exposing the vortex thermometer in the air stream will be cancelled by the cooling effect known to occur in a vortex tube. Therefore, a thermometer in the cold air region of a vortex tube suspended from an aircraft in flight should register the same reading as a thermometer suspended motionless in the same air.

There are two distinct types of vortex tubes: (1) the counterflow vortex and (2) the uniflow vortex. Air enters the tube tangentially from a source, through a nozzle which is perpendicular to the longitudinal axis of the tube. In a counterflow vortex tube, a throttling valve allows the cold air generated near the tube axis to be forced out through this orifice so that cold air flows out one end of the tube and warm air flows out through the other end. In a uniflow vortex tube one end of the tube is closed. All of the air is discharged out one end but the central core near the closed end is cold. As the air is pushed from the cold zone, it mixes with the warm air before being discharged. Thus, the air issuing from a uniflow vortex tube is thoroughly mixed and not much different in temperature from the supply air.

This invention proposes to mount a resistance thermometer along the central axis of a uniflow vortex tube adjacent the closed end. The tangential entry nozzle is also located near the closed end so that the thermal unit lies in the cold zone of the vortex tube. Thus, since the cooling effect of the vortex tube will counteract the heating caused by the lead in nozzle, the thermal unit will read the true free air temperature. The air then passes along the axis of the tube where it is thoroughly mixed with the warm air and then out through the exhaust.

It is an object of this invention to obtain a correct reading of the free air temperature by a vortex tube thermometer suspended from the flying aircraft.

Other objects and many of the attendant advantages of this invention will be readily appreciated as the same becomes better understood by reference to the following detailed description when considered in connection with the accompanying drawings wherein:

Figure 1 is a top plan view of the vortex thermometer.

Figure 2 is a cross-sectional view of the inlet nozzle taken along the lines 2—2 of Figure 1.

Figure 3 is a cross-sectional view of the cap and temperature probe.

Figure 4 is a cross-sectional view taken along line 4—4 of Figure 1.

Figure 5 is a cross-sectional view taken along line 5—5 of Figure 1.

Figure 6 is a partial side elevation showing the exhaust region.

Referring to the drawings there is disclosed a cylindrical tube 1 which forms the vortex tube of the instant invention. The tube 1 is closed at one end by the cap 2. Adjacent to the cap end 2, the tube is formed with a tangential opening 3 which receives the rectangular inlet nozzle 4. The joint between the tube and the inlet nozzle is secured by welding. The nozzle 4 has outwardly flared sections 5 for forming a wide mouth facing the direction of flight. The inlet nozzle is secured to the tube along a tangent line so that air entering through the nozzle will follow a circular path in the tube.

The cap 2 has a central bore 6 having an enlarged threaded bore 7. A temperature probe 8 has a threaded portion 9 received in the threaded cap and a thermal sensing unit 10 extending through the bore 6 of the cap and into the vortex tube. The thermal sensing unit may be either the resistive or thermocouple type. When the temperature probe is mounted in the cap 2 the thermal sensing unit lies along the axis of the vortex tube and in the cold air region. The temperature probe 8 has a hexagon head 11 so that it may be secured in the cap.

In a vortex tube the shape and cross-sectional area of the exhaust affects the static pressure which exists where the internal flow is discharged and this is related to the pressure fields in the interior of the vortex tube where the temperature reading is being taken. To approach true static pressure, the exhaust section 12 has an elliptical opening 13. The exhaust section 12 is formed by gradually tapering the vortex tube from the circular portion 14, shown in Figure 4, to the elliptical portion 15, shown in Figure 5. Two angular sections 16 and 17, also elliptical in cross-section (not shown), gradually change the direction of the air flow a full 90° where the air is then exhausted downstream through the elliptical opening 13. Since the device is to be mounted on an aircraft, the exhaust section 12 is enclosed by a fairing 18 which is secured to the exhaust section 12 by welds 19 and 20, weld 20 securing the fairing 18 to the periphery of the open end 24 of the exhaust section 12 to thereby locate the elliptical opening 12 in the trailing edge 26 of the fairing 18. The fairing 18 follows the shape of the exhaust section as shown in Figures 5 and 6. A fitting 22 on the tube 1 is used to mount the device on an aircraft.

In use, the device is mounted on a section of the aircraft. The air enters through the inlet nozzle 4 tangentially to the tube 1 causing a vortex flow to be formed. The heating effect due to exposing the vortex tube in the air stream is counteracted by the cooling effect known to occur in the vortex tube. Since the thermal unit is immersed only in the cold air region of the vortex tube an accurate reading of the free air temperature is obtained. The air flows along the tube toward the exhaust section and the cold and warm air gradually mix until the air is discharged at a temperature approximately the same as the supply air.

The diameter of the thermal sensing unit is critical since the core of cold air is of relatively small diameter compared with the tube diameter. However, the thermal sensing unit must be of sufficient diameter to have the rigidity to withstand the vibrations experienced in its location. A thermal sensing unit having a ⅛" diameter mounted in the cold air core of a one inch diameter vortex tube gave excellent results. This vortex thermometer reads the correct free air temperature within one degree C. for all Mach numbers up to 0.75, for all humidities up to approximately 100% and for a range of temperatures from −40° to +40° C.

Obviously many modifications and variations of the present invention are possible in the light of the above teachings. It is therefore to be understood that within the scope of the appended claims the invention may be practiced otherwise than as specifically described.

What is claimed is:

1. An instrument for measuring the true temperature of the air in a moving air stream comprising a conduit having a cylindrical portion with an inlet aperture in the wall thereof for admitting air into said conduit and having an elliptical portion terminating in a substantially right-angular portion defining an elliptical-shaped opening for exhausting air from said conduit, nozzle means carried by said conduit for directing ram air through said inlet aperture tangentially into said cylindrical portion to produce a vortical air flow therethrough, said nozzle means and said elliptical-shaped opening being positioned to admit and exhaust air, respectively, in substantially opposite directions, temperature sensing means operatively connected to said conduit and extending axially of said cylindrical portion for measuring the temperature of the air in the central region of said vortical air flow, and a fairing carried by said conduit and having said elliptical-shaped exhaust opening defined by said substantially right angular portion positioned in the trailing edge thereof, said fairing being operable to maintain a substantially static pressure region in the air stream adjacent said elliptical-shaped exhaust opening to thereby insure an accurate temperature measurement by said temperature sensing means.

2. A device for measuring the true temperature of air comprising a conduit having a cylindrical portion with an inlet aperture in the wall thereof for admitting air into said conduit and an elliptical portion terminating in an elliptical-shaped opening for exhausting air from said conduit, nozzle means carried by said conduit in registry with said inlet aperture and defining a passageway for the admission of air tangentially into said conduit to thereby produce a vortical flow therethrough, said nozzle means and said elliptical-shaped opening being positioned to admit and exhaust air respectively in substantially opposite directions, cap means carried by said cylindrical portion for closing one end thereof, temperature sensing means carried by said cap means and extending axially of said cylindrical portion for indicating the temperature of the central region of said vortical air flow, and a fairing carried by said conduit with the elliptical-shaped opening of said elliptical portion positioned in the trailing edge thereof, said fairing being operable to maintain a substantially static pressure region in the ambient air adjacent to said elliptical-shaped opening.

3. An instrument for measuring the true temperature of the air in a moving air stream comprising a conduit having a cylindrical portion with an inlet aperture in the wall thereof for admitting air into said conduit and having an elliptical portion terminating in an angular bent portion defining an elliptical-shaped opening for exhausting air from said conduit, nozzle means associated with said conduit for directing ram air through said inlet aperture tangentially into said cylindrical portion to produce a vortical air flow therethrough, said nozzle means facing in a substantially upstream direction relative to said air stream and said elliptical-shaped exhaust opening facing in a substantially downstream direction relative to said air stream, cap means carried by said cylindrical portion and provided with a bore therein substantially coaxial with said cylindrical portion, temperature sensing means carried in said bore and extending axially of said cylindrical portion for sensing the temperature of the central region of said vortical air flow, and a fairing carried by said conduit and having said elliptical-shaped exhaust opening defined by said angular bent portion positioned in the trailing edge thereof, said fairing being operable to effect a reduction in the air flow separation adjacent said elliptical-shaped exhaust opening and thereby being operable to maintain a substantially static pressure region in the airstream surrounding said elliptical-shaped exhaust opening.

References Cited in the file of this patent

UNITED STATES PATENTS 2,764,023    Vonnegut  ---------------  Sept. 25, 1956